UNITED STATES PATENT OFFICE.

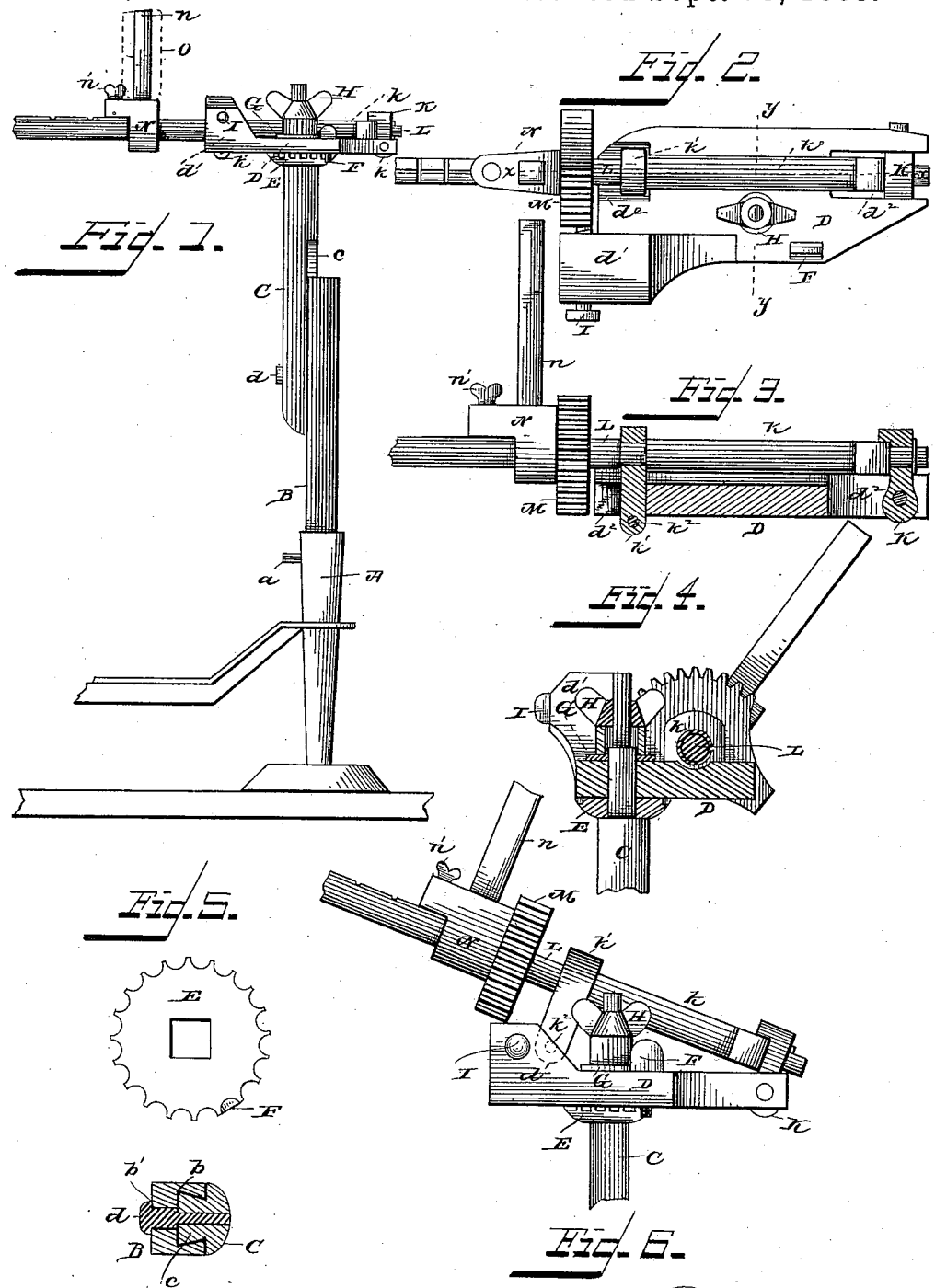

FREDERICK HAITZ, OF TOWANDA, ILLINOIS.

UMBRELLA-SUPPORT.

SPECIFICATION forming part of Letters Patent No. 326,214, dated September 15, 1885.

Application filed March 31, 1885. (No model.)

*To all whom it may concern:*

Be it known that I, FREDERICK HAITZ, a citizen of the United States, residing at Towanda, in the county of McLean and State of Illinois, have invented a new and useful Improvement in Umbrella-Supports, of which the following is a specification, reference being had to the accompanying drawings.

My invention relates to an improvement in umbrella-supports; and it consists in the peculiar construction and combination of devices, that will be more fully set forth hereinafter, and particularly pointed out in the claims.

In the accompanying drawings, Figure 1 is a side elevation of an umbrella-support embodying my invention. Fig. 2 is a top plan view of the same. Fig. 3 is a detailed sectional view taken on the line $xx$ of Fig. 2. Fig. 4 is a similar view taken on the line $yy$ of Fig. 2. Figs. 5 and 6 are detailed views.

A represents a vertical post which is stepped in a block in the bottom of the vehicle, and supported by a bracket on the seat or side of the vehicle. In the upper end of the post A is made a socket, in which is placed the reduced lower end of the vertical supporting-bar B. A transverse pin, $a$, passes through the post A and bar B and secures them together. In the bar B is made a dovetailed groove, $b$, to receive the dovetailed tongue $c$, that is made in a bar, C. A spring-actuated bolt, $d$, is secured to the post C, and is adapted to enter either of the series of openings $b'$, formed in the bar B, and thus secure the bar C to the bar B at any desired point. The upper end of the bar C is reduced, as shown, and passes through a horizontal platform, D. This platform is pivoted on the bar C, and rests upon a circular rack, E, that is fixed to the bar C. The teeth in the edge of the rack E are semicircular in shape, and through the platform D passes a turning lock-pin, F, the lower end of which is semicircular in shape, and enters one of the teeth of the rack E, and thereby locks the platform to the bar C when in the position shown in Fig. 2. By turning the pin F halfway around it disengages the rack, and the platform D is then free to be turned on the bar C to any point desired.

A washer, G, and clamp-nut H are placed on the upper end of the bar C, and bear upon the upper side of the platform D, to keep said platform in place on the rack.

One end of the platform is provided with a lug or bracket, $d'$, through which passes a spring-actuated bolt, I.

Slots $d^2$ are cut in opposite ends of the platform D, in a line with each other, and in one of these slots is fulcrumed a hinge, K. With this hinge is formed a hollow sleeve, $k$, and a depending lug, $k'$, that passes down through the slot at the opposite end of the platform from which the hinge is fulcrumed. A transverse pin or key, $k^2$, passes through an opening formed in the lug $k'$ on the under side of the platform, and secures the hinge horizontally thereto.

Through the hollow sleeve passes the rear reduced round end of a horizontal bar, L. A segmental rack, M, is secured to the bar L at one end of the hinge, with which rack the bolt I engages. The outer end of the bar L may be either square, half-round, or of any other preferred shape, and on this angular portion of the bar L slides a bracket, N, which has a vertical stem, $n$, that enters a recess or socket made in the lower end of the umbrella-handle O.

This umbrella may be of any of the well-known varieties in common use, but should preferably be one of my improved umbrellas, adapted especially for this purpose, for which I have filed an application for Letters Patent of the United States.

By means of the platform D and the rack and pin the umbrella may be swung around to any desired point of a circle, and by means of the bar L, the rack M, and the engaging bolt I the umbrella may be tilted or inclined to any desired angle. A set-screw, $n'$, is provided for the bracket N, to clamp said bracket to the bar L at any desired point.

When the umbrella is removed from the support and it is desired to remove the support from the wagon or vehicle, the pin $k^2$ is withdrawn, and the bar L can be folded back against the bars B C by means of the hinge K, and thus be entirely out of the way, and adapt the support to be folded into a small compass.

Having thus described my invention, I claim—

1. The combination of the vertical post, the dovetailed bars secured together, one of said bars being socketed in the post, the horizontal platform pivoted on the upper end of one of the bars, the horizontal bar journaled to the platform, the segmental rack secured to the bar, and the bolt for engaging the rack, substantially as described.

2. The combination of the bar C, the circular rack secured thereto, the platform pivoted on the bar, the pin for securing the platform to the rack, the hinge secured to the platform, the horizontal bar journaled in the hinge, the segmental rack secured to the said bar, and the bolt for engaging with said rack and locking the bar, substantially as described.

3. The combination of the post A, bar B, socketed in said post, bar C, dovetailed to bar B, the circular rack secured to bar C, the platform pivoted on the said bar, the pin for securing the platform to the rack, the hinge fulcrumed in the platform, the horizontal bar journaled in the hinge, the segmental rack secured to said bar, the bolt for engaging with said rack, the bracket sliding on the horizontal bar, and the set-screw for securing the bracket to the bar, substantially as described.

In testimony that I claim the foregoing as my own I have hereto affixed my signature in presence of two witnesses.

FREDERICK HAITZ.

Witnesses:
WILLIAM B. CARLOCK,
CLAYTON C. HERR.